United States Patent [19]

Welder

[11] Patent Number: 4,658,947
[45] Date of Patent: Apr. 21, 1987

[54] TRANSFER MECHANISM

[75] Inventor: William C. Welder, Morgan Hill, Calif.

[73] Assignee: Raymond Production Systems, Hollister, Calif.

[21] Appl. No.: 670,397

[22] Filed: Nov. 8, 1984

[51] Int. Cl.$^4$ .............................................. B65G 47/74
[52] U.S. Cl. ............................. 198/346.2; 198/463.3; 198/372; 198/750
[58] Field of Search .............. 198/370, 372, 436, 598, 198/367, 457, 346.2, 463.3, 371, 750, 597, 859, 369

[56] References Cited

U.S. PATENT DOCUMENTS

| | | | |
|---|---|---|---|
| 1,923,548 | 8/1933 | Mason | 198/369 |
| 1,980,261 | 11/1934 | Fenton | 198/367 |
| 3,134,765 | 5/1964 | Pierson et al. | 198/457 |
| 3,173,554 | 3/1965 | Ebbert | 198/457 |
| 3,200,967 | 8/1965 | Delzanno | 198/859 |
| 3,519,119 | 7/1967 | Hershey, Jr. | 198/372 |
| 3,522,942 | 12/1967 | Hepp | 198/369 |
| 3,571,892 | 3/1971 | Levy | 198/859 |
| 3,690,435 | 9/1972 | King et al. | 198/463.3 |
| 3,822,777 | 7/1974 | Jepsen | 198/372 |
| 3,868,024 | 2/1975 | Lee | 198/371 |
| 3,888,366 | 6/1975 | Prahst | 198/750 |
| 3,912,071 | 10/1975 | Nielsen | 198/365 |
| 4,109,781 | 8/1978 | Moons | 198/457 |
| 4,174,774 | 11/1979 | Bourgeois | 198/457 |
| 4,181,214 | 1/1980 | Szasz et al. | 198/463.3 |
| 4,463,944 | 8/1984 | Grantham | 198/859 |
| 4,483,651 | 11/1984 | Nakane et al. | 198/369 |
| 4,534,157 | 8/1985 | McGill et al. | 198/463.3 |
| 4,541,520 | 9/1985 | Greenlee, III | 198/372 |
| 4,569,435 | 2/1986 | McGovney | 198/859 |

FOREIGN PATENT DOCUMENTS

| | | | |
|---|---|---|---|
| 1050920 | 3/1979 | Canada | 198/859 |
| 2653039 | 5/1978 | Fed. Rep. of Germany | 198/367 |
| 56-75318 | 6/1981 | Japan | 198/369 |
| 56-149947 | 11/1981 | Japan | 198/367 |
| 57-21258 | 2/1982 | Japan | 198/463.3 |
| 57-67418 | 4/1982 | Japan | 198/463.3 |
| 57-189920 | 11/1982 | Japan | 198/436 |
| 562129 | 5/1975 | Switzerland | 198/457 |

OTHER PUBLICATIONS

Sections from a Litton Manual entitled "Powered Accessories", Litton UHS (Unit Handling System) pp. 198-202.
Bosch Flexible Automation—"Transfer Systems with Bosch FMS for the Assembly and Interlinking Technique".
Firestone advertising brochure for "Airstroke Actuators and Airmount Isolators".
Advertising brochure for Origa Rodless Cylinders.
Ermanco, XenoRol, Minimum Pressure Live Roller Conveyor Standard Chain Transfer, H-24, 7-1-79.
Powered Chain Right Angle Transfer, p. 18 Model AOCT-9920 Air Operated Lift Powered Chain Transfer.

*Primary Examiner*—Joseph E. Valenza
*Assistant Examiner*—Daniel R. Alexander
*Attorney, Agent, or Firm*—Malcolm B. Wittenberg

[57] ABSTRACT

A device for removing or sending an article from a conveyor of a transport system to and from work stations located therealong comprising platforms capable of being raised or lowered so that an article being carried by the conveyor can be taken out of physical contact with the conveyor at various work station locations. Once the article has been raised out of contact with the central conveyor, a closed loop belt driven by a fluid actuated cylinder causes the article to be conveyed onto or away from the central conveyor.

13 Claims, 7 Drawing Figures

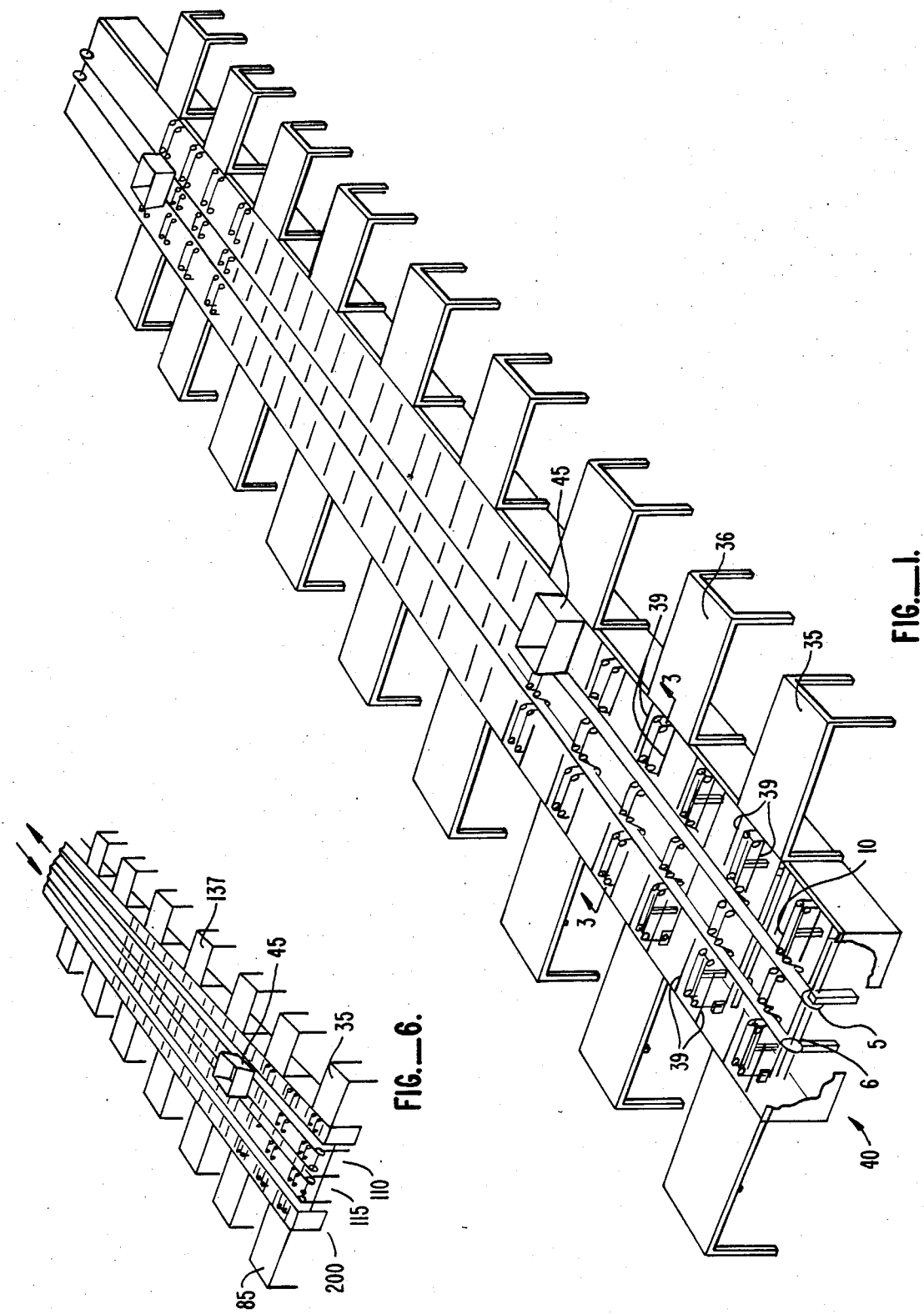

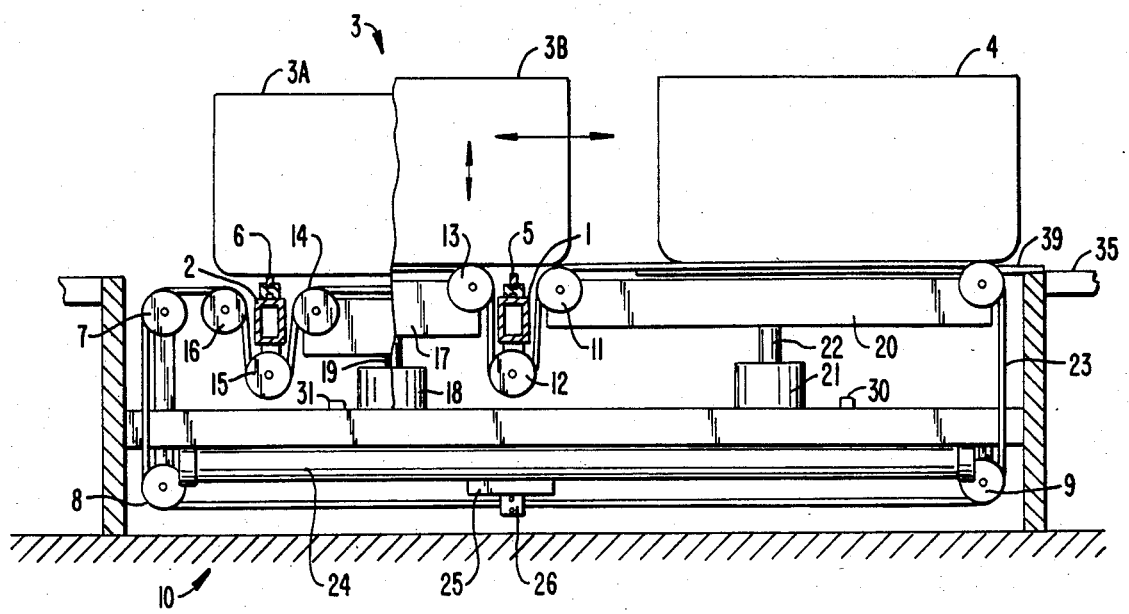
FIG.—2.
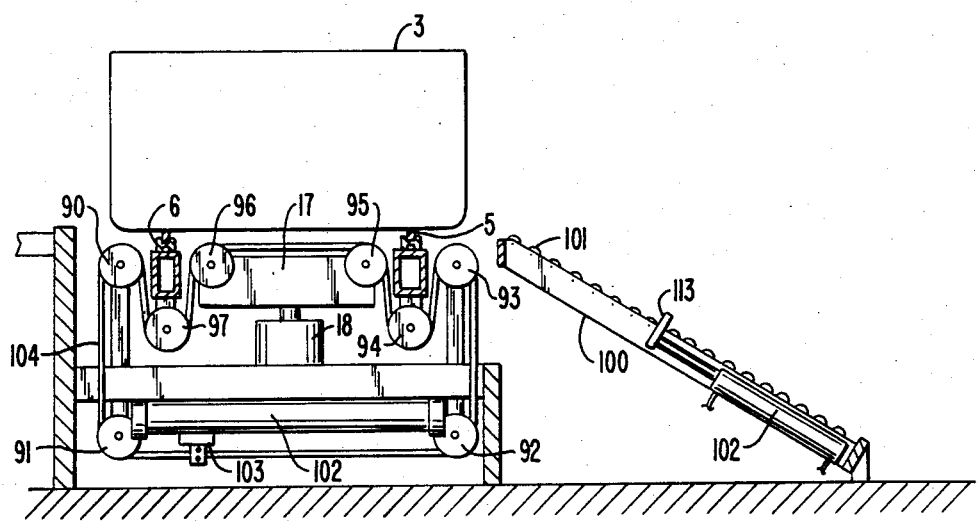
FIG.—5.

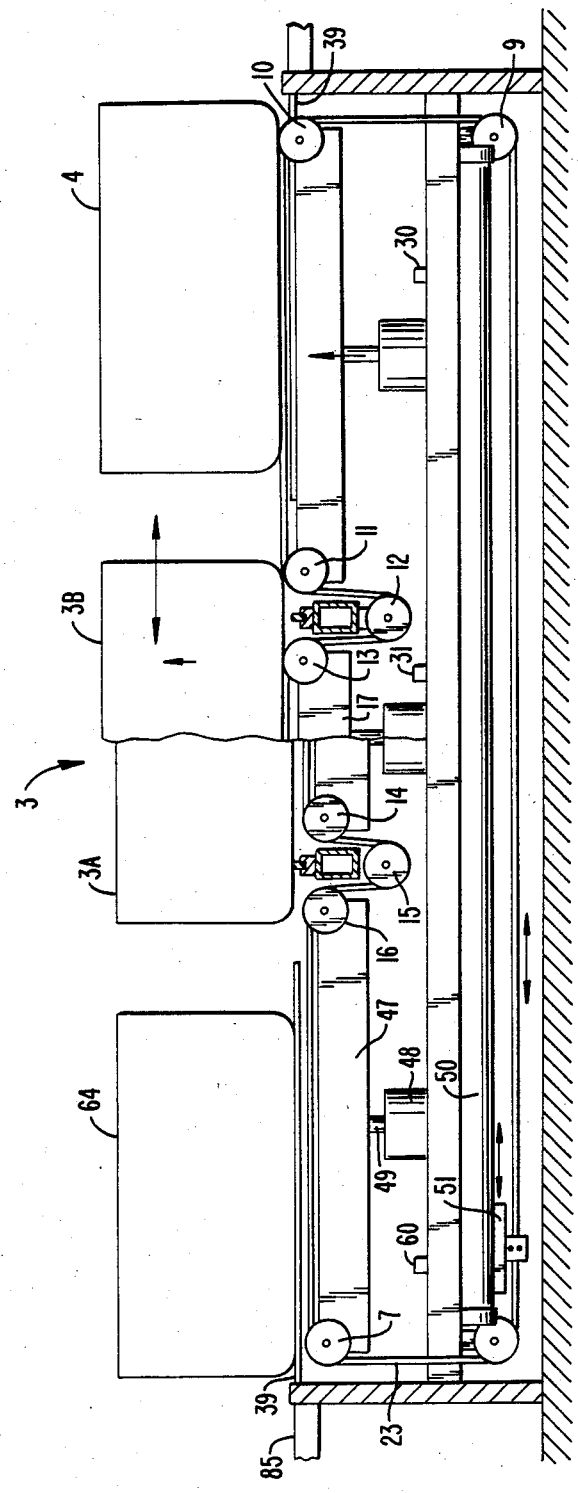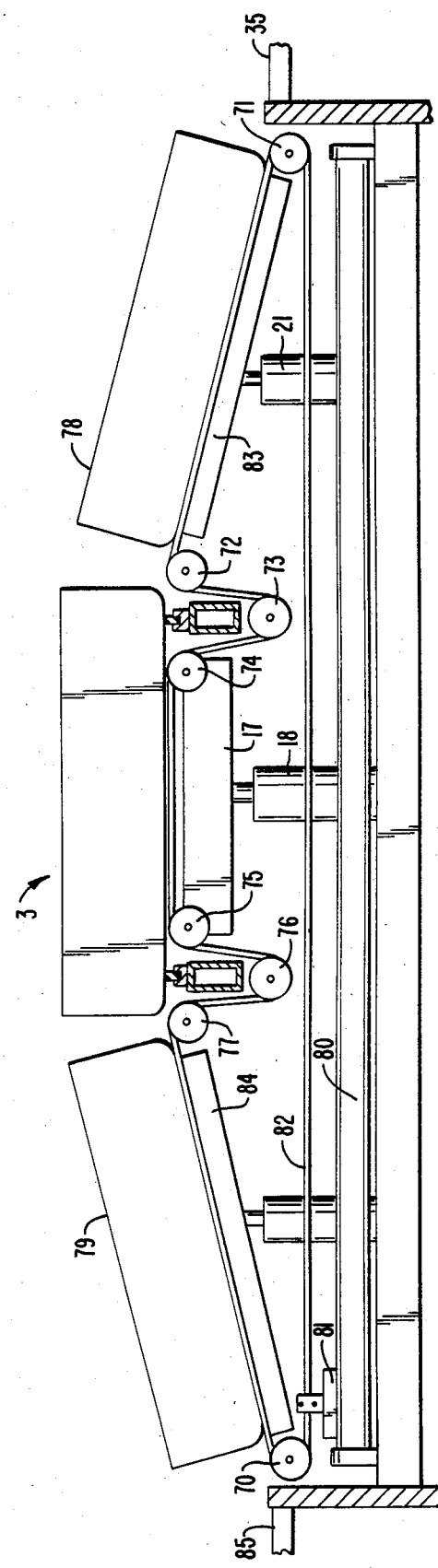

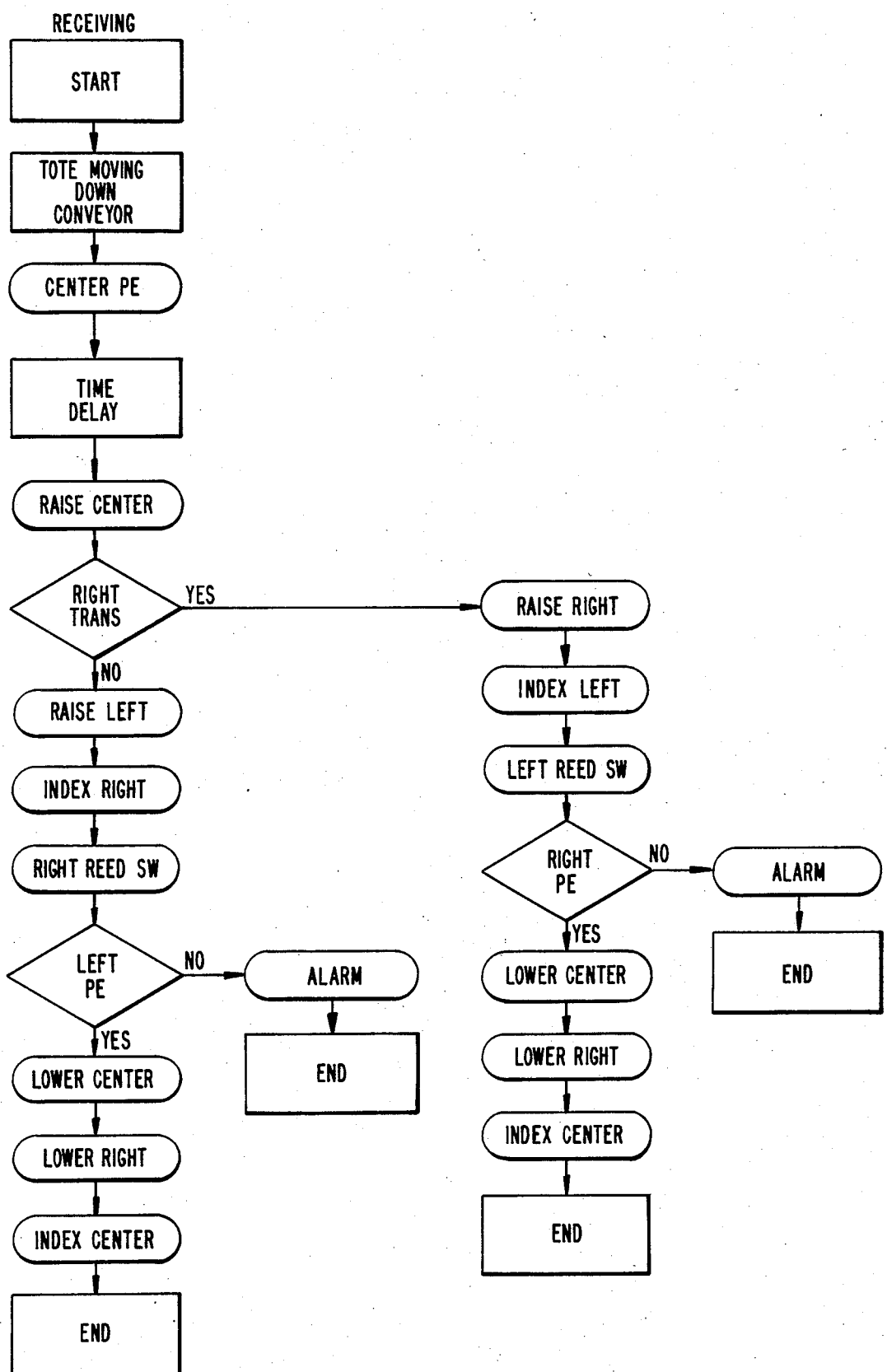
FIG._7.

4,658,947

TRANSFER MECHANISM

TECHNICAL FIELD OF INVENTION

This invention relates generally to a device for use in conjunction with material transporters, and more particularly, transporters for moving workpieces among various work stations in an assembly line production system. The invention is capable of deflecting moving workpieces or articles from a central conveying means without the use of motors, complex gearing or deflector arms.

BACKGROUND OF THE INVENTION

A popular transporter for work stations utilizes an elongated belt that moves at a continuous high rate of speed for moving articles or baskets of articles from an end of the belt to an appropriate work station. When that particular work station has completed its operation on the article or articles, they are returned to the beginning of the belt or transported to a different work station for the next succeeding operation to be performed on them. The article or articles are placed on the belt at each station, and they are removed from the belt to a succeeding work station by various means such as by an arm that extends across the belt at an intercepting angle to divert the article from the belt to the work station. Diverting arms, however, suffer certain inherent disadvantages such as their inability to power an article back onto a central moving belt from the work station surface, as well as the fact that swing arms require a substantial free area to enable the arm to make its necessary arc of travel during the removal cycle.

There have been attempts made in the past to provide deflectors or removal devices, while eliminating the diverting arm concept. For example, Bosch and Rapistan teach powered deflector devices but in each instance, motors and various actuating means are incorporated in the deflector devices to move the transported articles. Such devices simply add to the complexity of an already complex system and when multiple work stations are provided in a typical transporter assembly, it is not unreasonable to assume that motor failure and a resultant system shut-down would be a common experience.

It is thus an object of the present invention to provide an improved article deflector or removal device which eliminates the need of a swing arm assembly and yet does not unnecessarily add to the complexity of the overall system.

It is yet another object of the present invention to provide an article deflector or removal device which is capable of moving the article to and from a work station as well as between moving conveyors which does not require the use of any motors or complex gearing.

These and further objects will be more readily appreciated when considering the following disclosure and appended drawings wherein:

FIGS. 1 and 6 are perspective views of typical transporter assemblies embodying the device of the present invention.

FIGS. 2-5 are front elevational views of various embodiments of the present invention.

FIG. 7 is a logic diagram for use in operating the device of the present invention.

SUMMARY OF THE INVENTION

In its broadest terms, the present invention is intended to be used with a transporter system which incorporates a conveying means for carrying thereon an article from at least one location therealong to at least a second location therealong. The invention comprises an improved device for removing an article from the conveying means and onto an adjacent work station and sending the article back onto the conveying means after work has been done thereon.

The device comprises a first platform located below the conveying means and means for raising the first platform a vertical height sufficient to raise an article resting on the first platform above and out of contact with the conveying means. At least one additional platform is then located adjacent the first platform and, in its broadest terms, the second platform is located between the first platform and the work station surface. In one embodiment, means are provided for raising the second platform a vertical height approximately equal to the vertical height of the first platform when the first platform is in a raised position. Belt means are provided forming a closed loop around the first and second platforms so that the top of the loop is above the platforms and the bottom of the loop is below the same. When the platforms are raised, the belt means is situated so that the upper surface of each platform is in contact with the belt, which is in further contact with the article to be conveyed. Below the platforms is situated a fluid driven cylinder which is functionally connected to the belt such that when the first and second platforms are raised, the belt means moves the article toward or away from an adjacent work station in a direction substantially opposite to the direction of travel of the fluid driven cylinder.

DETAILED DESCRIPTION OF THE INVENTION

Turning to FIG. 1, a typical application of the device of the present invention is shown in which production line 40 is shown having a plurality of individual work stations 35, 36, etc. that are positioned along both sides of a central conveying means, in this instance, comprising individual lengths 5 and 6 such as standard conveyor belting, V-belts, polyurethane belting, steel cable, steel link chain, plastic link chain, plastic table top chain, etc. Articles to be moved along the belt are illustrated as tote or basket 45 that contains small parts being manufactured. An example of such parts is small semiconductor components or printed circuit boards wherein each work station or groups of work stations perform one manufacturing step, the next group of work stations performing the next manufacturing step, and so forth. Central conveyor belting 5 and 6 thus have the purpose of moving the article from one station to another for performing different assembly or other operations on the articles.

A first embodiment of the present invention for the transfer of articles from the central conveyor section bounded by individual belting 5 and 6 to and from processing stations such as 35 and 36 is shown in FIG. 2. In considering the operation of this device, it must first be recognized that article 3 generally comprising a basket or tote containing items to be worked upon at the various stations is caused to pass down the central conveying means while being supported by belts 5 and 6. At the proper point along the transporter system, certain things occur which will result in removal of article 3 to a position shown by article 4 in FIG. 2 and to support bands 39 for final transfer to the appended work station surface, such as station 35 (FIG. 1). Although this operation is dictated by a controller, the operational logic of which will be discussed with reference to FIG. 7, at this point it is only the physical device which need be addressed in visualizing the present invention.

Turning again to FIG. 2, once the proper location has been addressed for removal of article 3 from the central conveyor, a signal is received by vertical raising and lowering means 18 which in turn extends support shaft 19 which in turn supports first platform 17. The vertical raising means can comprise any device which those skilled in the art would recognize as being capable of performing a height adjustment function. Typical of such devices are air bags, air cylinders and electric solenoids. One such ideal commercially available product for acting as a height raising means is the AIR STROKE actuator available from the Firestone Tire and Rubber Company. It is to be noted that prior to actuation of vertical height raising means 18, tote 3 is in a lowered position as shown by cut-away section 3A, and thus resides upon the top surface of central conveyor elements 1 and 2 on moving belting 5 and 6.

Below and throughout substantially the entire width of the transport mechanism is located fluid driven cylinder 24 having movable projection 25 which is capable of traveling along the length of the cylinder in response to the fluid pressure exerted therein. Appended to element 25 is connector 26 which is fixedly attached to belting 23. The belting, which in turn can comprise single or multiple loops of such things as conveyor belting, V-belts, polyurethane belting, steel cable, steel link chain, plastic link chain and plastic table top chain, is caused to form a closed loop around idler rollers 7 through 16. It is noted that belt means 23 forms a closed loop located both above and below platforms 17 and 20 and comes into frictional contact with the top surfaces of platforms 17 and 20, as well as the bottom surface of totes 3 and 4 only when vertical height raising means 18 and 21 extend platforms 17 and 20 via support shafts 19 and 22.

In operation, when the appropriate signal is received and tote 3 resides above platform 17 on the central conveyor, vertical rising means 18 is actuated and platform 17 rises which removes tote 3 from contact with belting 5 and 6. This would immediately stop the downstream progress of tote 3 substantially above first platform 17. At substantially the same time, second vertical height raising means 21 is actuated which extends shaft 22 and raises second platform 20 to substantially the same vertical height as the height of the first platform.

After the above has been accomplished, fluid driven cylinder 24 is actuated causing element 25 to proceed toward the left in FIG. 2 which, in turn, would move tote 3 to the position shown as tote 4 above the second platform onto support bands 39 and, continuing the progress, the tote would eventually slide onto the adjacent work station 35.

In returning the tote to the central conveying means, the process would simply be reversed. More specifically, the operator would engage tote 4 with belt 23 by simply nudging the tote from the surface of the work station onto the support bands. Support platforms 20 and 17 would again be raised to lift the tote from bands 39. Fluid driven cylinder 24 would then be actuated which would move projection 25 from the left to the right for a distance sufficient to center the tote above the central conveying means in a position depicted generally by cut-away tote 3B. Vertical raising means 18 and 21 would then be caused to lower first and second platforms 17 and 20 until tote 3 would reside entirely upon belting 5 and 6 at which point the tote would continue its downstream travel until the appropriate signal was received that another work station was desirous of receiving the tote for further processing.

A further understanding of the present invention can be derived from consideration of the logic flow diagram depicted in FIG. 7 with specific reference to the mechanical structure of FIG. 2. Turning first to the logic cycle labelled "receiving", the operator depresses a start button which would trigger the transfer mechanism to engage the next tote moving down the central conveying means. Photo eye 31, upon "seeing" an article on the conveying means would experience a slight time delay to enable the tote to reach a position centered above first platform 17 at which time vertical raising means 18 would be actuated, which would in turn raise platform 17 and tote 3. At approximately the same point in time, photo eye 30 could then read whether an article was above second platform 20. If the indication was made that a tote did not then reside over second platform 20, the second platform would be raised via vertical height raising means 21 and projection 25 indexed left along fluid driven cylinder 24. When the end of the stroke was reached, a switch (not shown) would terminate the stroke of protrusion 25 and thus stop the movement of belt 23 causing the tote to stop its path of travel. The right hand photo eye 30 would then again be actuated to determine whether a tote resided over second platform 20. If nothing were read by the photo eye, an alarm would sound and the process cycle would end—that is, the transfer mechanism would recognize that no tote was transferred. However, if the photo eye contacted an object, the first and second platforms would then be lowered and the object, such as tote 4 in FIG. 2, would then reside upon support bands 39 and would remain in position awaiting removal by an operator at work station 35. The fluid driven cylinder 24 would then index center to remain in position to accept the next tote coming down the conveying means.

In again referring to FIG. 7, it must be noted that at the "right trans" decision point the above example assumed that the tote would be proceeding to the right which made reference to FIG. 2 most convenient. If the controller was pre-programmed to transfer the tote to the left rather than the right, a two platform device which was the mirror image of FIG. 2 could be used or a more universally functional device, such as that shown in FIG. 3, could be employed. In this instance, rollers 7 and 8 have been extended to the left so that belt means 23 completely encircles above and below newly recited third platform 47, which is in turn supported by vertical height raising means 48 and support member 49. It is further noted that in this embodiment, fluid driven cylinder 50 is longer in length than cylinder 24 of FIG. 2 as it must now be long enough to provide for a linear track for projection 51 to enable movement of belt 23 sufficient to move tote 3 all the way from the far right (position of tote 4) to the far left (position of tote 64).

Referring again to FIGS. 3 and 7, if the decision were made to transfer the tote to the left, third platform 47 would be raised as well as platform 17 to raise tote 3 from contact with conveying belts 5 and 6. The fluid driven cylinder would then index to the right which would cause belt 23 to move tote 3 into the position shown by tote 64. At this point, the platforms would lower and the tote would reside upon support bands 39. If no tote existed in the position of tote 64, the left photo eye 60 would see nothing, an alarm would sound and the cycle would end. However, if the photo eye did indicate a positive response, i.e., that a tote existed above the photo eye, third platform 47 and first platform 17 would lower and the fluid driven cylinder 50 would index protrusion 51 back to its center position to await a command to receive yet another tote.

FIG. 4 illustrates yet a further embodiment of the present invention. It differs from the embodiment of FIG. 3 in the use of platforms 83 and 84 which are inclined with respect to first platform 17 which, itself, remains unchanged from the previous embodiments. In other respects, the embodiment of FIG. 4 works quite similarly to the previously discussed embodiments of the present invention. For instance, when the tote is to be removed to the right, both the first platform 17 and second platform 84 are raised via vertical raising means 18 and 21, respectively. At that point, fluid driven cylinder 80 indexes protrusion 81 to the left which moves belt 82 to power tote 3 to the right to take the position of tote 78. When powering to the left, tote 3 would assume the position of tote 79, while protrusion 81 was indexed to the right. It is noted in this example that idler rollers 70 through 77 are employed which enables one to eliminate two rollers from the embodiment shown in FIG. 3. A more significant advantage of the embodiment shown in FIG. 4 is that the final transferred position of the tote as either tote 78 or 79 is in an incline toward work station 35 or 85 respectively. The tote can then be caused to simply slide from the second or third platforms 83 or 84, respectively, toward the work stations. The use of support bands would be optionally provided to facilitate the removal of the totes.

Yet a further embodiment is depicted in FIG. 5 where but a single platform 17 and vertical raising means 18 are provided. In this instance, idler rollers 90 through 97 are employed, however, belt 104 and fluid driven cylinder 102 have been shortened. As with FIG. 2, the embodiment shown in FIG. 5 depicts the transfer of tote 3 only to the right, however, a mirror image of this device could be prepared showing removal to the left and a composite structure paralleling the embodiment of FIG. 3 could also be depicted in this instance.

Referring again to FIG. 5, once the decision was made to remove tote 3 to the right, first platform 17 would be raised via vertical raising means 18 at which time fluid driven cylinder 102 would index protrusion 103 to the left moving the tote to the right through the influence of belt 104. As article 3 is powered onto incline roller section 100, the article would roll upon idler rollers 101 and gravitationally proceed toward the accepting work station. When applying the article back to the central conveying means 5 and 6, one could simply push the tote back up incline roller section 100 or an automated pusher means 102 which could, for example, be hydraulically actuated with pusher arm 103 could be employed such as the pusher mechanism disclosed and claimed in U.S. application Ser. No. 291,497, filed on Aug. 10, 1981, now abandoned, the disclosure of which is incorporated herein by reference.

As a means of illustrating yet a further advantage inherent in the practice of the present invention which is not enjoyed by prior art configurations is the ability to transfer articles between central conveying belts moving in opposite directions. For example, reference is made to FIG. 6 which shows the basic structure of a conveying system similar to FIG. 1 but with two centrally located conveying lines 110 and 115 moving in opposite directions. As shown, article 45 resides upon central conveyor 110, however by employing a transfer mechanism such as that shown in FIG. 3 within transport system 200, one could transfer tote 45 between lines 110 and 115 at will. Thus, tote 45 could be processed at station 35, could then proceed to station 137 downstream along central conveyor line 110 and then be shifted over to conveyor line 115 for transfer to station 85 for further processing. Flexibility of this nature is virtually impossible through the use of swing arm structures and, when using such prior art devices, rather elaborate turnabouts would be incorporated in the transport system to enable the tote to assume positioning on conveying lines having different directionality.

It is a critically important aspect of the present invention to provide a transport mechanism which is capable of performing as provided above and yet which does not employ motors or other complex devices therein. In practicing the present invention, after the platform(s) have been raised, the tote or article to be transferred is moved via a belt without the intervention of any motor device. Generically, the driving force for the moving belt used for transferring the article has been described as a fluid driven cylinder. Ideally, the present invention should employ a rodless cylinder, such as those available from Fletch/Air sold under the trademark "ORIGA". As an alternative, the present invention can be practiced through the use of a cable cylinder.

While the present invention has been particularly described in terms of specific embodiments thereof, it will be evident in view of the present disclosure that numerous variations upon the invention are enabled thereby without yet departing from the teaching thereof. Accordingly, the invention is to be broadly constructed and limited only by the scope and spirit of the claims now appended hereto.

I claim:

1. For a transport system wherein a conveying means is provided for carrying thereon an article from at least one location therealong to a second location therealong, an improved device for removing an article from said conveying means at said second location to an adjacent work station comprising:

A. a first platform located below said conveying means;

B. means for raising said first platform a vertical height sufficient to raise an article residing on said first platform above and out of contact with the conveying means;

C. a second platform located on approximately the same horizontal plane as the first platform and between said first platform and the work station;

D. means for raising said second platform a vertical height approximately equal to the vertical height of said first platform when said first platform is in a raised position;

E. belt means forming a closed loop and located above and below said first and second platforms such that when said platforms are in their raised positions, said belt means is in contact with the upper surface of each platform and in further contact with the article to be conveyed; and F. a fluid driven cylinder located below said first and second platforms functionally connected to said belt means such that when said first and second platforms are raised said belt means moves said article toward or away from said adjacent work station in a direction substantially opposite to the direction of travel of the fluid driven cylinder.

2. The system of claim 1 further comprising a third platform located on approximately the same horizontal plane as the first and second platforms and on the opposite side of said conveying means as the second platform and further comprising means for raising said third platform a vertical height approximately equal to the vertical height of said first and second platforms when said first and second platforms are in their raised positions.

3. The system of claim 2 wherein said belt means forms a closed loop and is located above and below said first, second and third platforms such that when any of the platforms are in their raised positions said belt means is in contact with the upper surfaces of the raised platforms and in further contact with the article to be conveyed when said article resides on one of the raised platforms.

4. The system of claim 3 wherein said fluid driven cylinder is provided of sufficient length such that when said cylinder is actuated from a centrally located rest position, said belt means is caused to move and transport said article from a position atop said first platform to atop either said second or third platforms in a direction substantially opposite to the direction of travel of the fluid driven cylinder.

5. The system of claim 1 wherein said fluid driven cylinder comprises a rodless air cylinder.

6. A method of removing an article from the conveying means of a transport system and onto a work station located adjacent the conveying means comprising:
  A. locating the article on said conveying means above a first platform;
  B. providing a second platform between the first platform and work station;
  C. providing a belt means as a closed loop located above and below the first and second platforms;
  D. providing a fluid driven cylinder below said first and second platforms functionally connected to said belt means;
  E. providing means for raising said first and second platforms a vertical height sufficient to raise said article above and out of contact with said conveying means;
  F. raising said first and second platforms a vertical height sufficient to raise said article above and out of contact with said conveying means; and
  G. actuating said fluid driven cylinder away from the work station to move said article to said work station.

7. For a transport system wherein a conveying means is provided for carrying thereon an article from at least one location therealong to at least a second location therealong, an improved device for removing an article from said conveying means at said second position to an adjacent work station comprising:
  A. a first platform located below said conveying means;
  B. means for raising said first platform a vertical height sufficient to raise an article residing on said first platform above and out of contact with the conveying means;
  C. a second platform located between said first platform and the work station which is positioned so that an edge of the second platform proximate the work station is of approximately the same vertical height as the work station while an edge of the second platform proximate the first platform is of approximately the same vertical height as the first platform;
  D. belt means forming a closed loop surrounding said first platform such that when said platform is in its raised position, said belt means is in contact with the upper surface of said first platform and in further contact with the article to be conveyed;
  E. fluid driven cylinder located below said first platform functionally connected to said belt means such that when said first platform is raised said belt means moves said article toward or away from said adjacent work station in a direction substantially opposite to the direction of travel of the fluid driven cylinder.

8. The system of claim 7 wherein said second platform is inclined so that the edge of the second platform proximate the first platform is of the same height as the first platform when the first platform is raised a vertical height sufficient to raise an article residing on the first platform above and out of contact with the conveying means.

9. The system of claim 7 which further comprises means for raising the second platform a vertical height approximately equal to the height of the first platform.

10. The system of claim 9 wherein said belt means forms a closed loop which is located above and below said first and second platforms such that when said first and second platforms are in their raised positions said belt means is in contact with the upper surface of each platform and in further contact with the article to be conveyed.

11. The system of claim 7 further comprising a third platform located on the opposite side of the conveying means as the second platform and positioned so that an edge of the third platform proximate the first platform is of approximately the same vertical height as the first platform.

12. The system of claim 11 which further comprises means for raising the second and third platforms a vertical height approximately equal to the height of the height of the first platform.

13. The system of claim 12 wherein said belt means forms a closed loop which is located above and below said first, second and third platforms such that when any of the platforms are in their raised positions said belt means is in contact with the upper surfaces of the raised platforms and in further contact with the article to be conveyed when said article resides on one of the raised platforms.

* * * * *